(12) United States Patent
Riche

(10) Patent No.: US 6,386,137 B1
(45) Date of Patent: May 14, 2002

(54) RESCUE SIGNAL DEVICE

(76) Inventor: Raphael Serge Riche, 295 Washington St., Hempstead, NY (US) 11550

( * ) Notice: Subject to any disclaimer, the term of this patent is extended or adjusted under 35 U.S.C. 154(b) by 50 days.

(21) Appl. No.: 09/586,348

(22) Filed: Jun. 2, 2000

(51) Int. Cl.$^7$ .............. B64B 1/40; B63C 9/08; B63C 9/125; B63C 9/23; B63C 9/105; B63C 9/22

(52) U.S. Cl. ............ 116/210; 441/89; 441/90; 441/92; 441/96

(58) Field of Search ............ 116/210; 441/89, 441/90, 92, 96; 137/223, 224, 226, 233, 234

(56) References Cited

U.S. PATENT DOCUMENTS

| | | | | |
|---|---|---|---|---|
| 3,768,501 A | * | 10/1973 | Elson et al. | 137/231 |
| 4,142,322 A | * | 3/1979 | Zeyra | 46/90 |
| 4,416,433 A | * | 11/1983 | Bellina | 244/33 |
| 4,498,871 A | * | 2/1985 | Burr | 441/80 |
| 4,498,881 A | * | 2/1985 | Buckle | 441/7 |
| 4,595,374 A | * | 6/1986 | Wass | 441/35 |
| 4,911,674 A | * | 3/1990 | Cole | 446/224 |
| 5,009,249 A | * | 4/1991 | Fisher et al. | 137/495 |
| 6,260,572 B1 | * | 7/2001 | Lou | 137/231 |
| 6,276,391 B1 | * | 8/2001 | Wu | 137/223 |
| 6,332,424 B1 | * | 12/2001 | Frink | 116/210 |
| 2001/0015224 A1 | * | 8/2001 | Freigang et al. | 137/224 |

FOREIGN PATENT DOCUMENTS

EP 0959293 A2 * 11/1999

* cited by examiner

Primary Examiner—Diego Gutierrez
Assistant Examiner—Gail Verbitsky

(57) ABSTRACT

A rescue signal device for indicating the location of a person requiring rescue attention. The rescue signal device includes a canister. The canister has a lumen therein adapted for holding helium under relatively high pressure. The canister has an aperture therein for access into the lumen. A valve means releases the helium from the canister. The valve means is fluidly mounted to the aperture in the canister. A balloon has an opening therein. An elongate tube has a first end and a second end. The first end of the tube is fluidly coupled to the valve means. The second end of the tube is fluidly coupled to the opening in the balloon, such that the helium may enter the balloon via the tube.

8 Claims, 3 Drawing Sheets

RESCUE SIGNAL DEVICE

BACKGROUND OF THE INVENTION

1. Field of the Invention

The present invention relates to signal devices and more particularly pertains to a new rescue signal device for indicating the location of a person requiring rescue attention.

2. Description of the Prior Art

The use of signal devices is known in the prior art. More specifically, signal devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,576,199; U.S. Pat. No. 5,620,114; U.S. Pat. No. 5,263,683; U.S. Pat. No. 4,683,914; U.S. Pat. No. 4,139,150; and U.S. Pat. No. 2,637,519.

While these devices fulfill their respective, particular objectives and requirements, the aforementioned patents do not disclose a new rescue signal device. The inventive device includes a canister. The canister has a lumen therein adapted for holding helium under relatively high pressure. The canister has an aperture therein for access into the lumen. A valve means releases the helium from the canister. The valve means is fluidly mounted to the aperture in the canister. A balloon has an opening therein. An elongate tube has a first end and a second end. The first end of the tube is fluidly coupled to the valve means. The second end of the tube is fluidly coupled to the opening in the balloon, such that the helium may enter the balloon via the tube.

In these respects, the rescue signal device according to the present invention substantially departs from the conventional concepts and designs of the prior art, and in so doing provides an apparatus primarily developed for the purpose of indicating the location of a person requiring rescue attention.

SUMMARY OF THE INVENTION

In view of the foregoing disadvantages inherent in the known types of signal devices now present in the prior art, the present invention provides a new rescue signal device construction wherein the same can be utilized for indicating the location of a person requiring rescue attention.

The general purpose of the present invention, which will be described subsequently in greater detail, is to provide a new rescue signal device apparatus and method which has many of the advantages of the signal devices mentioned heretofore and many novel features that result in a new rescue signal device which is not anticipated, rendered obvious, suggested, or even implied by any of the prior art signal devices, either alone or in any combination thereof.

To attain this, the present invention generally comprises a canister. The canister has a lumen therein adapted for holding helium under relatively high pressure. The canister has an aperture therein for access into the lumen. A valve means releases the helium from the canister. The valve means is fluidly mounted to the aperture in the canister. A balloon has an opening therein. An elongate tube has a first end and a second end. The first end of the tube is fluidly coupled to the valve means. The second end of the tube is fluidly coupled to the opening in the balloon, such that the helium may enter the balloon via the tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rescue signal device apparatus and method which has many of the advantages of the signal devices mentioned heretofore and many novel features that result in a new rescue signal device which is not anticipated, rendered obvious, suggested, or even implied by any of the prior art signal devices, either alone or in any combination thereof.

It is another object of the present invention to provide a new rescue signal device which may be easily and efficiently manufactured and marketed.

It is a further object of the present invention to provide a new rescue signal device which is of a durable and reliable construction.

An even further object of the present invention Is to provide a new rescue signal device which is susceptible of a low cost of manufacture with regard to both materials and labor, and which accordingly is then susceptible of low prices of sale to the consuming public, thereby making such rescue signal device economically available to the buying public.

Still yet another object of the present invention is to provide a new rescue signal device which provides in the apparatuses and methods of the prior art some of the advantages thereof, while simultaneously overcoming some of the disadvantages normally associated therewith.

Still another object of the present invention is to provide a new rescue signal device for indicating the location of a person requiring rescue attention.

Yet another object of the present invention is to provide a new rescue signal device which includes a canister. The canister has a lumen therein adapted for holding helium under relatively high pressure. The canister has an aperture therein for access into the lumen. A valve means releases the helium from the canister. The valve means is fluidly mounted to the aperture in the canister. A balloon has an opening therein. An elongate tube. has a first end and a second end. The first end of the tube is fluidly coupled to the valve means. The second end of the tube is fluidly coupled to the opening in the balloon, such that the helium may enter the balloon via the tube.

Still yet another object of the present invention is to provide a new rescue signal device that has a simple valve control of inserting one tubular member into another so that a highly injured person may still be able to actuate the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
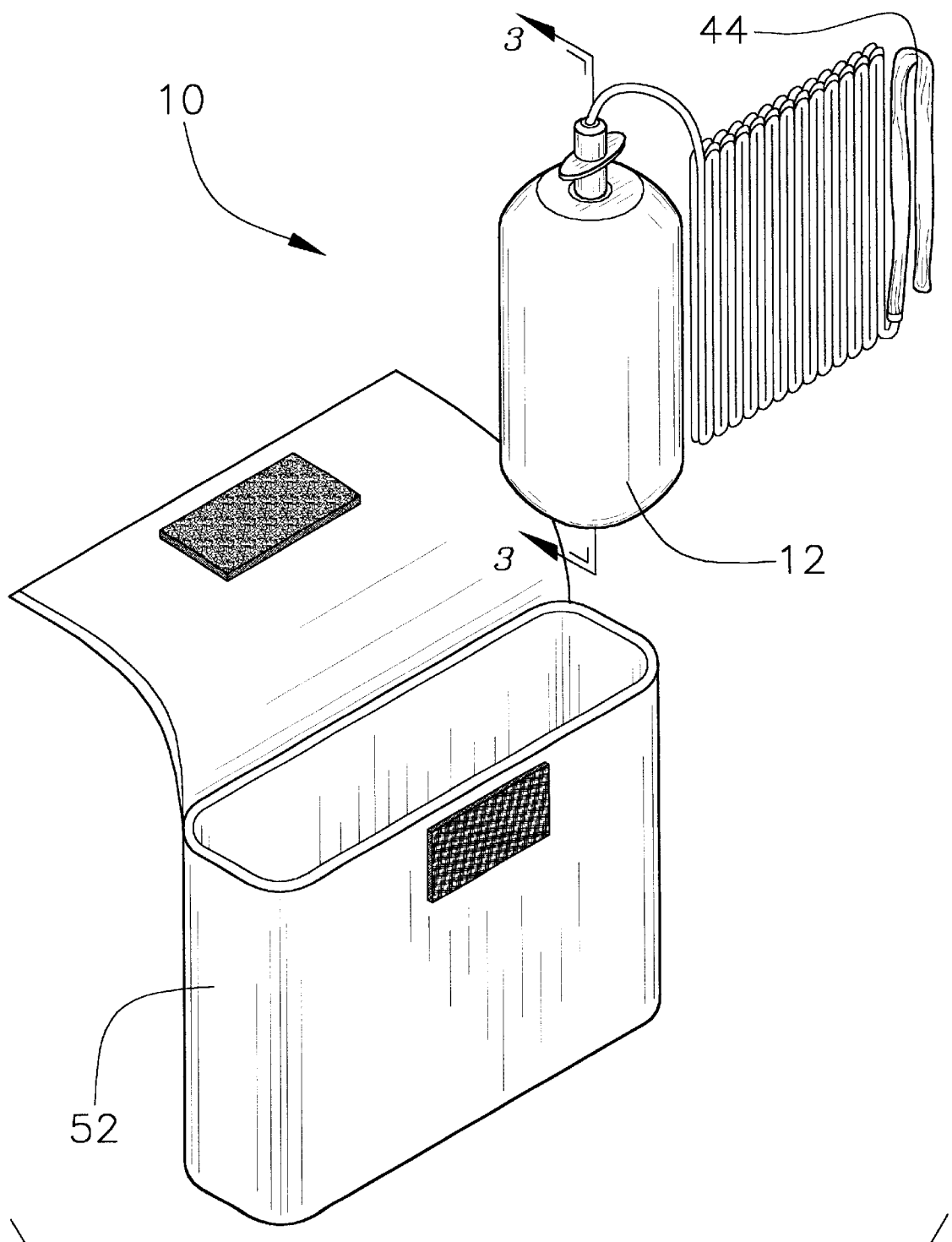
FIG. 1 is a schematic perspective view of a new rescue signal device according to the present invention.
Figure 2:
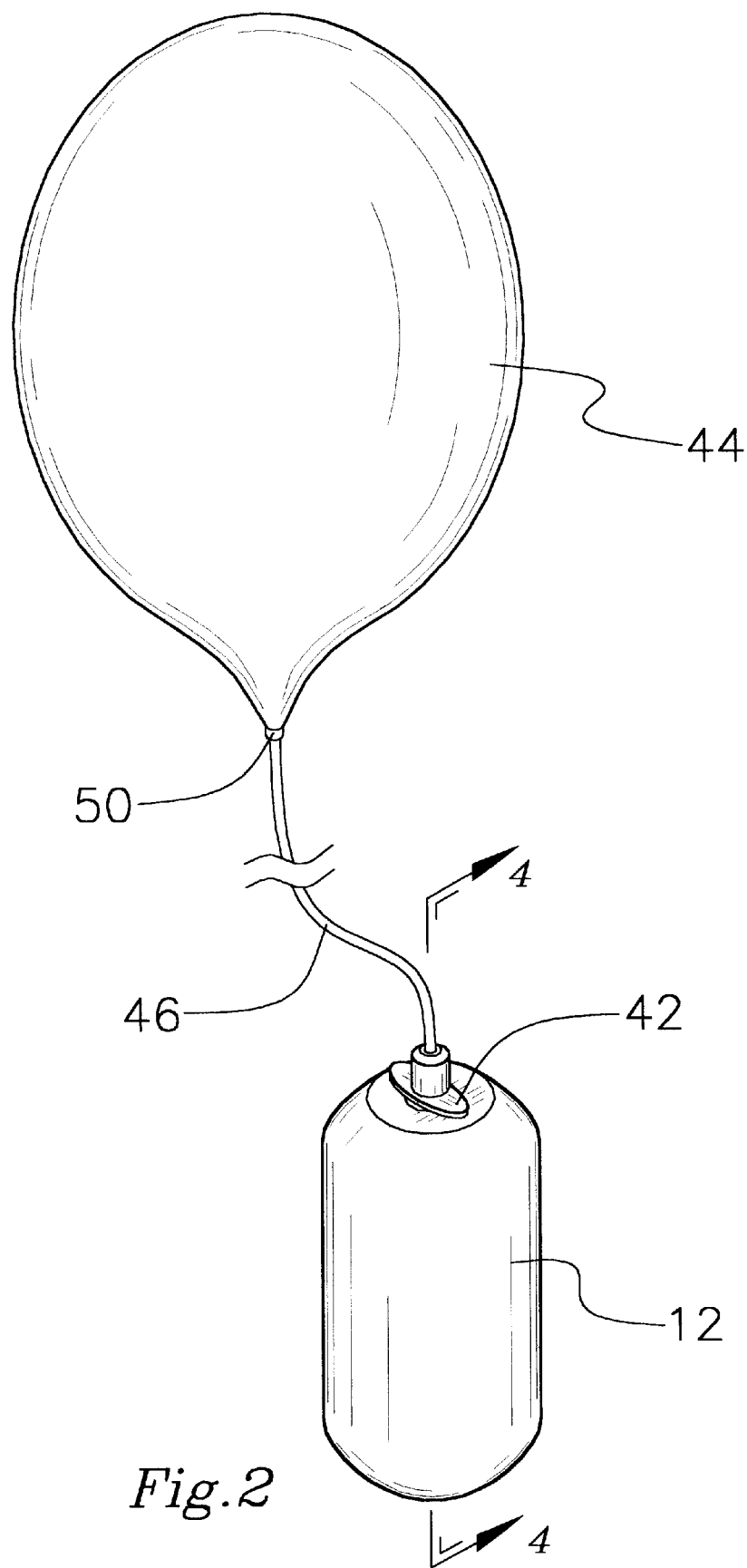
FIG. 2 is a schematic perspective view of the present invention.

With reference now to the drawings, and in particular to FIGS. 1 through 4 thereof, a new rescue signal device embodying the principles and concepts of the present invention and generally designated by the reference numeral 10 will be described.

As best illustrated in FIGS. 1 through 4, the rescue signal device 10 generally comprises a canister 12. The canister has a lumen 14 therein adapted for holding helium under relatively high pressure. The canister 12 has an aperture 15 therein for access into the lumen.

A valve means 16 releases the helium from the:canister 12. The valve means includes a first tubular member 18. The first tubular member 18 has a top edge 20, a bottom edge 22 and a peripheral wall 24 therebetween. The tubular member 18 is generally hollow and has openings in the top 20 and bottom 22 edges. The first tubular member 18 is integrally coupled to an edge of the aperture 15 such that the bottom edge 22 of the first tubular member 18 is within the lumen 14. The first tubular member 18 is fluidly coupled to the canister 12 such that helium may not escape between the first tubular member 18 and the edge of the aperture 15. The top edge 20 of the first tubular member 18 is substantially adjacent to the aperture 15.

A second tubular member 28 has a top side 30, a bottom side 32 and peripheral wall 34 extending therebetween. The second tubular member 28 is generally hollow. The top side 30 has a hole 36 therein extending into an interior of the second tubular member 28, and the peripheral wall 34 of the second tubular member has a bore 38 therein. The bore 38 extends into an interior of the second tubular member 28 and is generally positioned adjacent to the bottom side 32 of the second tubular member 28.

The second tubular member 28 is slidably mounted in the first tubular member 18 such that the top side 30 of the second tubular 28 member is extended above the top edge 20 of the first tubular member 18 and the bottom side 32 of the second tubular member 28 is extended below the bottom edge 22 of the first tubular member 20. The second tubular member 28 is generally twice as long as the first tubular member 18. A plurality of seals 40 is positioned between the first 18 and second 28 tubular members. The seals 40 are adapted to prevent helium from escaping the canister 12 between the first 18 and second 28 tubular members. The seals 40 preferably comprise O-rings.

An actuating means assists in slidably moving the second tubular member 28 with respect to the first tubular 18 member such that the bore 38 may be positioned within the lumen 14. The actuating means is a plate 42 mounted to an outside surface of the peripheral wall 34 of the second tubular member 28. The plate 42 is orientated generally perpendicular to a longitudinal axis of the second tubular member 28 and extends in opposite directions away from the second tubular member 28.

A balloon 44 has an opening therein. The balloon 44 is a conventional balloon used for rescue devices and comprises elastomeric material. The balloon 44 is preferably colored a fluorescent color such as fluorescent yellow or fluorescent orange.

An elongate tube 46 has a first end 48 and a second end 50. the first end 48 of the tube 46 is fluidly coupled to the opening 36 in the top side 30 of the second tubular member 28. The second end 50 of the tube 46 is fluidly coupled to the opening in the balloon 44. The tube 46 comprises an elastomeric material. The tube 46 preferably has a length between 60 and 120 feet but this length may depend on the use.

A carrying case 52 for carrying the canister, the tube and the balloon may be used. A conventional back pack would suffice, though the sides of the carrying case should have sufficient rigidity to withstand impacts which may open the valve means 16.

Figures 3, 4:
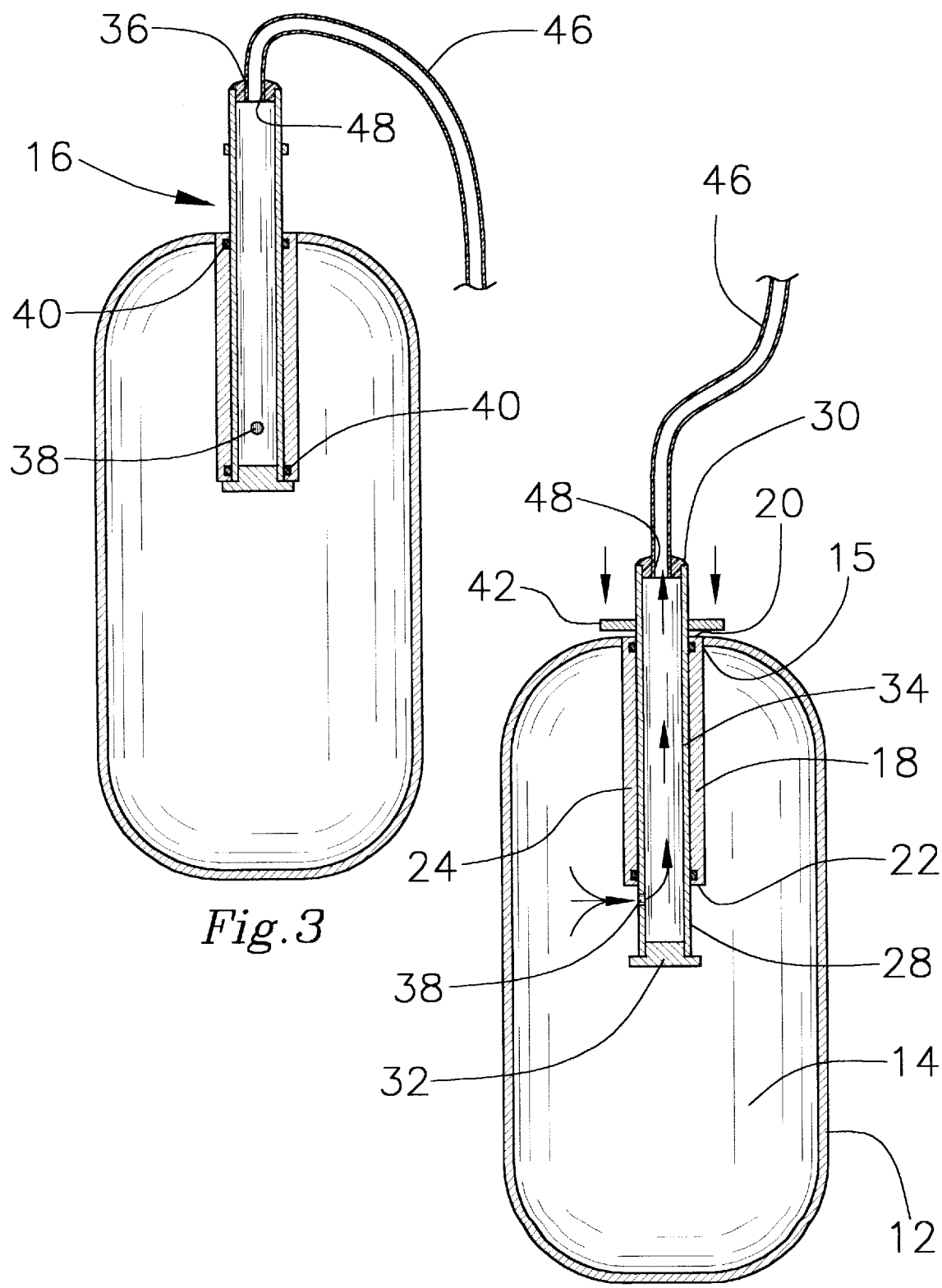
FIG. 3 is a schematic side cross-sectional view taken along line 3—3 of the present invention.
FIG. 4 is a schematic side cross-sectional view taken along line 4—4 of the present invention.

In use, should a person require assistance, the second tubular member 28 is slid into the first tubular member 14. The pressure from the helium would keep the second tubular member 28 in an extended position as shown in FIG. 3. When the second tubular member 28 is pressed downwardly, the bore 38 is exposed to the lumen 14 and the helium enters the second tubular member 28 through the bore 38 and enters the tube 46. The balloon 44 is filled with helium supplied to it by the tube 46 and the balloon 44 ascends into the sky so that rescue workers may easily spot the location of the user. Since all that. is required to actuate the device is depression of the second tubular member 28, an injured person may easily use it.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rescue marking device for deploying a signal balloon, said device comprising:
- a canister having a lumen therein adapted for holding helium under relatively high pressure, said canister having an aperture therein for access into said lumen;
- a valve means for releasing said helium from said canister, said valve means being fluidly mounted to said aperture in said canister; a balloon;
- a tube being elongate and having a first end and a second end, said first end of said tube being fluidly coupled to said valve means, said second end of said tube being fluidly coupled to an opening in said balloon, such that said helium may enter said balloon via said tube; said valve means comprising:
  - a first tubular member being integrally mounted to an edge of said aperture and extending into said lumen, said first tubular member being hollow and having an open top and bottom edge;
  - a second tubular member being slidably mounted in said first tubular member, said second tubular member being generally hollow and having an open top side, said second tubular member having a peripheral wall having a bore therein, said bore being generally nearer a bottom side of said second tubular member, an air seal being positioned between said first and second tubular members; and
  - wherein said tube is fluidly coupled to said opening in said top side of said second tubular member such that when said second tubular member is slidably moved into said lumen said bore is exposed to said lumen such that said helium leaves said lumen via said bore.

2. The rescue marking device as in claim 1, wherein said valve means further comprises
- an actuating means for slidably moving said second tubular member with respect to said first tubular member such that said bore may be positioned within said lumen, said actuating means being a plate mounted to an outside surface of said peripheral wall of said second tubular rememder.

3. The rescue marking device as in claim 1, wherein said tube has a length generally between 60 feet and 120 feet.

4. The rescue marking device as in claim 1, wherein said tube has a length greater than 60 feet.

5. A rescue marking device for deploying a signal balloon, said device comprising:
- a canister having a lumen therein adapted for holding helium under relatively high pressure, said canister having an aperture therein for access into said lumen;
- a valve means for releasing said helium from said canister, said valve means comprising;
  - a first tubular member having a top edge, a bottom edge and a peripheral wall therebetween, said tubular member being generally hollow and having openings in said top and bottom edges, said first tubular member being integrally coupled to an edge of said aperture such that said bottom edge of said first tubular member is within said lumen, said top edge of said first tubular member being substantially adjacent to said aperture;
  - a second tubular member having a top side, a bottom side and peripheral wall extending therebetween, said second tubular member being generally hollow, said top side having a hole therein extending into an interior of said second tubular member, said peripheral wall of said second tubular member having a bore therein, said bore extending into an interior of said second tubular member and being generally positioned adjacent to said bottom side of said second tubular member;
  - said second tubular member being slidably mounted in said first tubular member such that said top side of said second tubular member is extended above said top edge of said first tubular member and said bottom side of said second tubular member is extended below said bottom edge of said first tubular member, a plurality of seals being positioned between said first and second tubular members, said seals being adapted to prevent helium from escaping said canister between said first and second tubular members, said seals comprising O-rings;
  - an actuating means for slidably moving said second tubular member with respect to said first tubular member such that said bore may be positioned within said lumen, said actuating means being a plate mounted to an outside surface of said peripheral wall of said second tubular member, said plate being orientated generally perpendicular to a longitudinal axis of said second tubular member;
- a balloon having an opening therein, said balloon comprising an elastomeric material, said balloon being colored a fluorescent color;
- a tube being elongate and having a first end and a second end, said first end of said tube being fluidly coupled to said opening in said top side of said second tubular member, said second end of said tube being fluidly coupled to said opening in said balloon, said tube comprising an elastomeric material; and
- a carrying case for carrying said canister, said tube and said balloon.

6. A rescue marking device for deploying a signal balloon, said device comprising:
- a canister having a lumen therein adapted for holding helium under relatively high pressure, said canister having an aperture therein for access into said lumen;
- a valve means for releasing said helium from said canister, said valve means being fluidly mounted to said aperture in said canister, said valve means comprising;
  - a first tubular member being integrally mounted to an edge of said aperture and extending into said lumen, said first tubular member being hollow and having an open top and bottom edge;
  - a second tubular member, said second tubular member being slidably mounted in said first tubular member, said second tubular member being generally hollow and having an open top side, said second tubular member having a peripheral wall having a bore therein, said bore being generally nearer a bottom side of said second tubular member, an air seal being positioned between said first and second tubular members; and wherein said tube is fluidly coupled to said opening in said top side of said second tubular member such that when said second tubular member is slidably moved into said lumen said bore is exposed to said lumen such that said helium leaves said lumen via said bore;

a balloon; and a tube being elongate and having a first end and a second end, said first end of said tube being fluidly coupled to said valve means, said second end of said tube being fluidly coupled to an opening in said balloon, such that said helium may enter said balloon via said tube.

7. The rescue marking device as in claim 6, wherein said valve means further includes an actuating means for slidably moving said second tubular member with respect to said first tubular member such that said bore may be positioned within said lumen.

8. The rescue marking device as in claim 7, wherein said actuating means comprises a plate mounted to an outside surface of said peripheral wall of said second tubular member.

* * * * *